United States Patent
Bundy et al.

(10) Patent No.: US 6,487,416 B1
(45) Date of Patent: Nov. 26, 2002

(54) METHOD AND SYSTEM FOR CONTROLLING ANTENNA DOWNTILT IN A CDMA NETWORK

(75) Inventors: Scott C. Bundy, Broomfield, CO (US); Thomas Scwhengler, Lakewood, CO (US); Mike Gilbert, Westminster, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/364,964

(22) Filed: Jul. 30, 1999

(51) Int. Cl.[7] .............. H04Q 7/20; H04B 7/00; H04B 15/00; H04B 17/00; H01Q 3/02
(52) U.S. Cl. ............ 455/453; 455/67.1; 455/67.3; 455/278.1; 455/452; 455/517; 455/561; 455/63; 455/562; 342/374
(58) Field of Search ............ 455/277.1, 278.1, 455/277.2, 67.3, 63, 453, 452, 517, 561, 562, 67.1; 342/372, 374

(56) References Cited

U.S. PATENT DOCUMENTS

| | | | | |
|---|---|---|---|---|
| 5,551,060 A | * | 8/1996 | Fujii et al. ............ 455/33.4 |
| 5,969,689 A | * | 10/1999 | Martek et al. ............ 343/758 |
| 6,002,676 A | * | 12/1999 | Fleming ............ 370/328 |
| 6,016,129 A | * | 1/2000 | Lauper ............ 343/867 |
| 6,078,824 A | * | 6/2000 | Sogo ............ 455/562 |
| 6,118,767 A | * | 9/2000 | Shen et al. ............ 370/252 |
| 6,167,035 A | * | 12/2000 | Veeravalli et al. ............ 370/331 |
| 6,188,373 B1 | * | 3/2001 | Martek ............ 343/893 |

\* cited by examiner

*Primary Examiner*—Edward F. Urban
*Assistant Examiner*—Meless Zewdu
(74) *Attorney, Agent, or Firm*—Brooks & Kushman P.C.

(57) ABSTRACT

A method and system for controlling downtilt of an antenna in a sector of a cell of a code division multiple access (CDMA) network utilizes dynamic application of antenna downtilt based on estimated relative sector capacity. In the method, current network conditions are monitored, relative sector capacity is estimated, and an antenna downtilt is selected. The selected antenna downtilt is dynamically applied to the antenna. Preferably, antenna downtilt is selected so as to effectively maximize relative sector capacity.

16 Claims, 9 Drawing Sheets

METHOD AND SYSTEM FOR CONTROLLING ANTENNA DOWNTILT IN A CDMA NETWORK

TECHNICAL FIELD

The present invention relates to methods and systems for selecting an antenna downtilt in a code division multiple access (CDMA) system, and to analysis of the reverse-link capacity of a cell-site.

BACKGROUND ART

In modern communication systems, there is a growing trend towards the multiple access technique known as code division multiple access (CDMA). In a code division multiple access system, a finite allocation of frequency, which may be the entire available frequency bandwidth or other amount of bandwidth as appropriate, is used by each call simultaneously. A transmission in a CDMA system includes a scrambled message and a code. Each call in progress has a unique code such that the receiver can pull the transmission out of the background noise by knowing the code for the call. For example, mobile clients may each be assigned a unique code on a per-call basis to use when transmitting.

CDMA is inherently an interference limited system, because the signal of every single mobile unit effectively contributes interference to the signals of all other mobile units. The total interference is due to mobiles being served by the same cell-site as well as mobiles being served by adjacent cell-sites. While the base station does need to receive signals from the mobiles being served by the same cell-site to maintain the respective links, undesired signals from mobiles being served by adjacent cell-sites generate interference. Generally, there are three different types of interference that are seen by the base station in the reverse-link from the mobile to the base station. The three interference types are same-sector interference, inter-sector interference, and out-of-cell interference. These three types of interference are seen by the antenna in a sector of a cell. That is, the network includes a plurality of cells, with each cell being made up of one or more sectors, three sectors being typical.

Same-sector interference is the interference seen by the sector antenna due to mobile devices within that sector. That is, signals from mobiles within the same sector contribute noise to each other. Inter-sector interference is the interference seen by the antenna due to mobile devices in other sectors of the same cell-site. That is, mobile devices within adjacent sectors may still fall within the antenna pattern of the sector of interest, thereby contributing noise. Lastly, out-of-cell interference is the interference seen by the antenna that comes from mobile devices in other cells, such as adjacent cells.

There is a need for a method and system that provides appropriate interference rejection without unduly compromising CDMA network performance.

DISCLOSURE OF INVENTION

It is, therefore, an object of the present invention to provide a method for controlling downtilt of an antenna in a sector of a cell of a code division multiple access (CDMA) network for mobile devices. The method comprises monitoring current network conditions and estimating relative sector capacity at a plurality of antenna downtilts for the current network conditions. The method further comprises selecting an antenna downtilt based on the relative sector capacity at the plurality of antenna downtilts and dynamically applying the selected downtilt to the antenna.

Preferably, the method further comprises estimating relative external interference rejection and relative sectorization efficiency. Preferably, the antenna downtilt is selected based on the relative external interference rejection, the relative sectorization efficiency, and the relative sector capacity at the plurality of antenna downtilts. Further, preferably, the method comprises estimating a percentage of mobile devices within the sector that are in a softer handoff region defined by a softer handoff margin between sectors within the same cell.

In a preferred embodiment, the estimated relative external interference rejection is based on a loading factor that is a ratio of the out-of-cell interference to same-sector interference. Further, in a preferred embodiment, the estimated relative sectorization efficiency is based on a ratio of a sum of same-sector interference and out-of-cell interference to a sum of the same-sector interference, the inter-sector interference, and the out-of-cell interference.

Further, in carrying out the present invention, a method for controlling downtilt in a sector of a cell of a code division multiple access (CDMA) network for mobile devices is provided. The method comprises monitoring current network conditions, estimating relative external interference rejection, estimating relative sectorization efficiency, estimating relative sector capacity, selecting an antenna downtilt, and dynamically applying the selected downtilt to the antenna. The relative external interference rejection is estimated, based in part on out-of-cell interference, at a plurality of antenna downtilts for the current network conditions. The relative sectorization efficiency is estimated, based in part on inter-sector interference, at the plurality of antenna downtilts for the current network conditions. The relative sector capacity is based on the corresponding relative external interference rejection and sectorization efficiency at the plurality of antenna downtilts. The antenna downtilt is selected based on the relative sector capacity at the plurality of antenna downtilts, and is preferably selected to provide optimal or maximum relative sector capacity.

Still further, in carrying out the present invention, a method for controlling downtilt of an antenna in a sector of a cell of a code division multiple access (CDMA) network for mobile devices is provided. The method comprises monitoring current network conditions, estimating relative external interference rejection, estimating relative sectorization efficiency, estimating relative sector capacity, selecting the antenna downtilt, and dynamically applying the selected downtilt to the antenna.

The relative external interference rejection is estimated at a plurality of antenna downtilts for the current network conditions according to:

$$IR(\Psi)=1/(1+\eta(\Psi))$$

wherein $\Psi$ is the downtilt angle, $IR(\Psi)$ is the estimated relative external interference rejection at downtilt angle $\Psi$, and $\eta(\Psi)$ is a loading factor at downtilt angle $\Psi$.

The loading factor is determined according to:

$$\eta(\Psi)=I_{ext}(\Psi)/I_{in}(\Psi)$$

wherein $I_{ext}(\Psi)$ is out-of-cell interference at downtilt angle $\Psi$ and $I_{in}(\Psi)$ is same-sector interference at downtilt angle $\Psi$.

The relative sectorization efficiency is estimated according to:

$$E_{sec}(\Psi)=(I_{in}(\Psi)+I_{ext}(\Psi))/(I_{in}(\Psi)+I_{sec}(\Psi)+I_{ext}(\Psi))$$

wherein $E_{ext}$ ($\Psi$) is the estimated relative sectorization efficiency at downtilt angle $\Psi$ and $I_{sec}$ ($\Psi$) is the inter-sector interference at downtilt angle $\Psi$.

The relative sector capacity at the plurality of antenna downtilt for the current network conditions is estimated based on a product of the corresponding relative external interference rejection and the corresponding relative sectorization efficiency. That is, relative sector capacity is preferably estimated according to:

$$C_{sec}(\Psi)=(1/(1+\eta(\Psi)))E_{sec}(\Psi)$$

wherein $C_{sec}$ ($\Psi$) is the estimated relative sector capacity at downtilt angle $\Psi$.

Yet further, in carrying out the present invention, a system for controlling downtilt of an antenna in a sector of a cell of a code division multiple access (CDMA) network for mobile devices is provided. The system comprises control logic configured to monitor current network conditions, estimate relative sector capacity, select an antenna downtilt, and dynamically apply the selected antenna downtilt to the antenna.

It is to be appreciated that the control logic may take any known form such as software, firmware, hardware, or combinations thereof. Further, the control logic may be located anywhere in the network, as appropriate for a particular application. For example, the control logic may be located at the base station, base station controller, mobile switching center, or may be located elsewhere in the network, for example, so as to be accessible by a network operations center which controls a plurality of base stations.

The advantages associated with embodiments of the present invention are numerous. For example, methods and systems of the present invention for controlling downtilt of an antenna in a sector of a cell of a code division multiple access (CDMA) network for mobile devices allow the antenna downtilt to be adjusted automatically as network conditions change. Antenna downtilt can be changed by either electrical or electro-mechanical downtilt. Further, it is to be appreciated that antenna downtilt may be changed based upon current network conditions on an effectively continuous basis.

The term "effectively continuous" means that the antenna downtilt is adjusted to suit current network conditions on a repetitive basis, wherein the time between potential adjustments of antenna downtilt is fixed or variable. For example, antenna downtilt may be dynamically adjusted on a daily basis, on a weekly basis, or on an hourly basis. Further, antenna downtilt may be adjusted more often during times of extreme variations in network conditions than at times when network conditions are generally stable. Preferably, downtilt is adjusted or selected so as to effectively maximize cell-site capacity.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
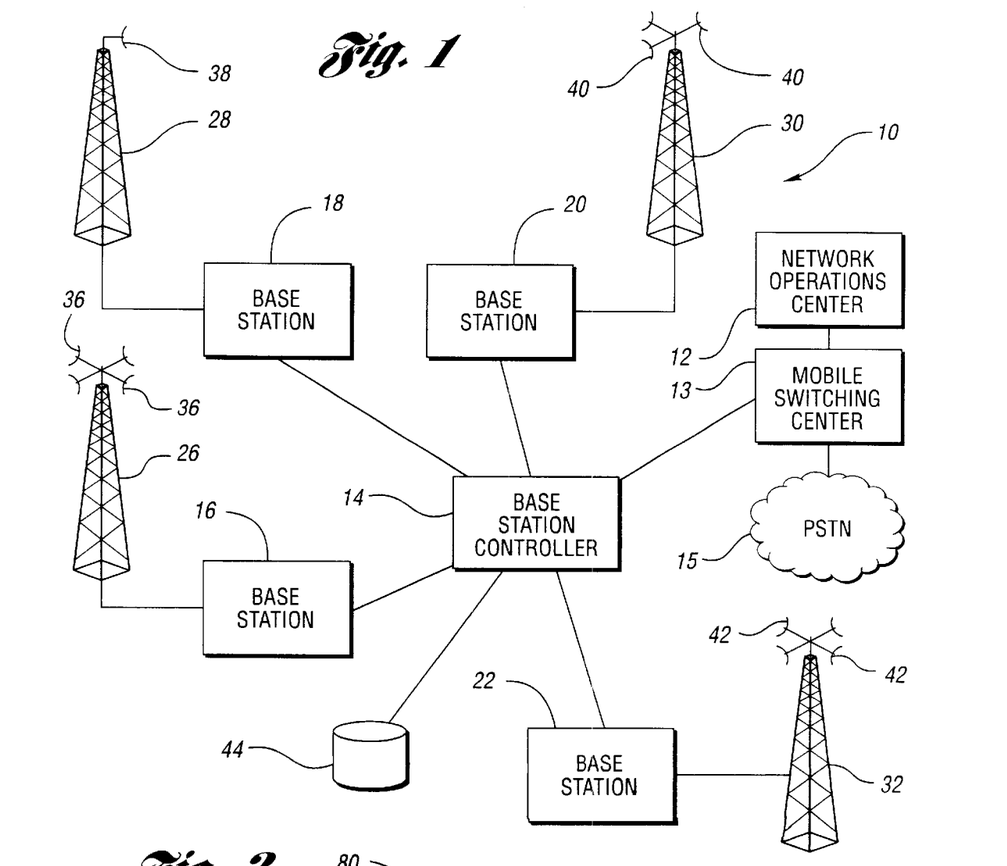
FIG. 1 is a diagram illustrating a system of the present invention for controlling downtilt of an antenna in a sector of a cell of a code division multiple access (CDMA) network for mobile devices that dynamically applies a selected downtilt to the antenna based on current network conditions which are monitored.

With reference to FIG. 1, a system of the present invention is generally indicated at 10. As shown, a network operation center 12 is connected to a mobile switching center 13, which in turn is connected to a base station controller 14. Base station controller 14 is connected to a plurality of base stations 16, 18, 20, 22. Of course, it is appreciated that system 10 may employ any number of different pieces of equipment between network operation center 12 and base stations 16, 18, 20, 22 as required for a particular application. Each base station 16, 18, 20, 22 has an antenna arrangement 26, 28, 30, 32, respectively.

That is, each base station 16,18,20,22 serves a cell of the CDMA network. Of course, four cells are illustrated for convenience and the network may include any number of cells. Each cell may include any number of sectors. As shown for convenience, the cell served by base station 16 has four sectors, with each sector being served by a separate antenna 36. Further, base station 18 is shown serving a cell having a single sector, with a single antenna 38. Yet further, base station 20 serves a cell having three sectors, with each sector being served by a separate antenna 40. Even further, base station 22 serves a cell-site having four sectors, with each sector served by an antenna 42. Of course, the antenna for each sector is appropriately selected so as to have an antenna field pattern that is appropriate for the particular geographics of that sector. Further, instead of serving each sector with one antenna, each sector could be served by two antennas simultaneously, which is an example of receive antenna diversity.

The intelligence of system 10 is the control logic that selects antenna downtilt for each antenna and directs the base station 16,18,20,22 to dynamically apply the selected downtilt to antennas, as needed based on current network conditions which are monitored. In the embodiment illustrated, the control logic is implemented as a set of processes monitoring the network and keeping track of relevant parameters in an intelligent database 44 connected to base station controller 14. Of course, the control logic may take any number of forms such as software, firmware, or hardware, and may be implemented in other ways such as at each base station 16,18,20,22 or may be implemented with portions of the control logic at the base stations and with other portions of the control logic controlled at network operations center 12.

By dynamically controlling the downtilt of the cell-site antennas by either electrical or electromechanical means, the desired capacity (such as maximum capacity based on current network conditions) of a cell-site may be achieved on a continual basis. As mentioned previously, a continual or effectively continuous basis simply means that antenna downtilt is adjusted periodically (but not requiring a fixed period). Dynamic controlling of antenna downtilt requires monitoring of certain network conditions including certain cell-site parameters and subsequent application of an algorithm to control the antenna downtilt as appropriate.

Figure 2:
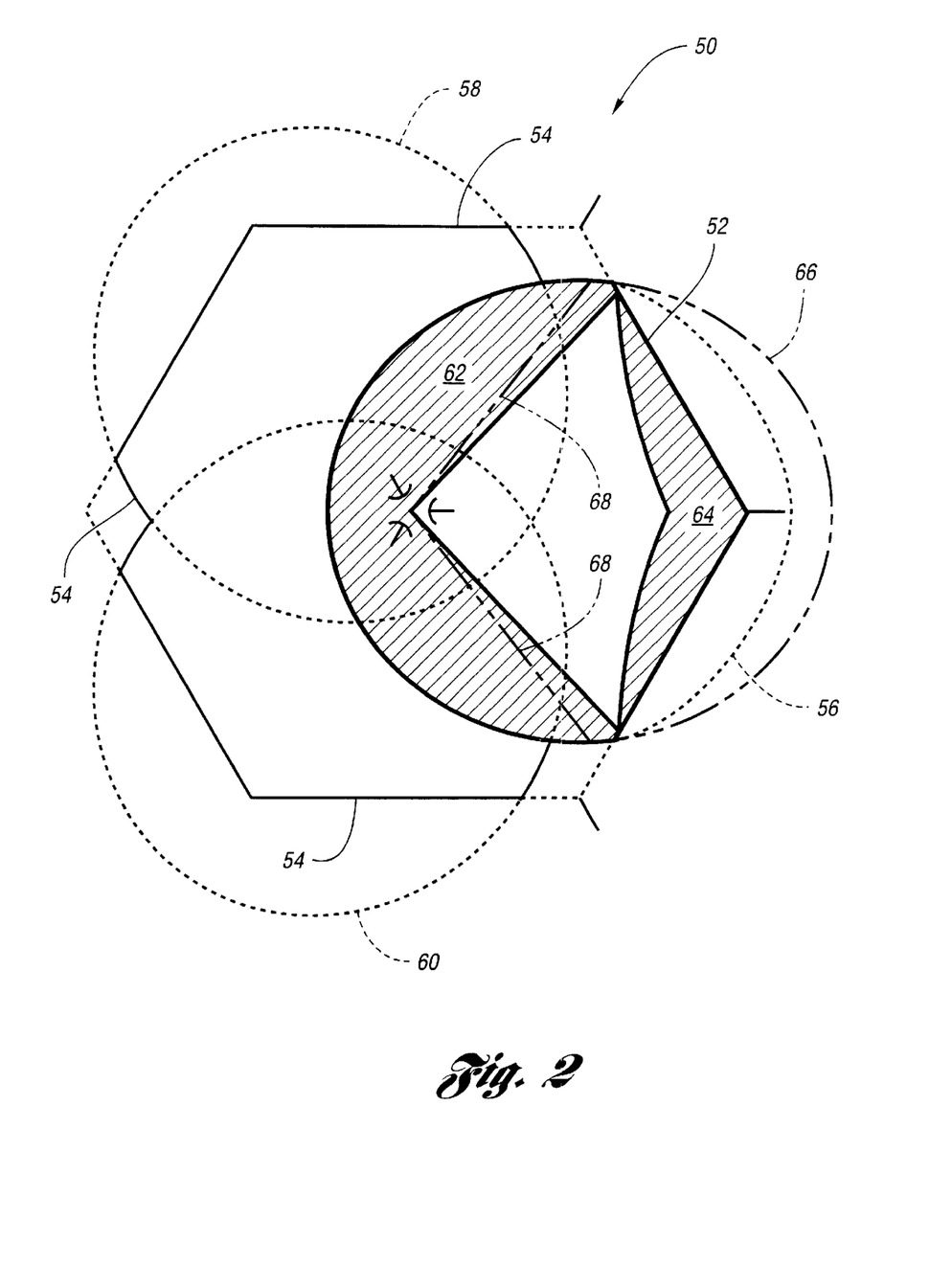
FIG. 2 is a diagram illustrating a model cell-site to show same-sector interference, inter-sector interference, out-of-cell interference, softer handoff regions, and soft handoff regions.

With reference to FIG. 2, interference sources, interference rejection, and sectorization efficiency will be explained in a model cell having three sectors. Of course, it is to be appreciated that a cell may have any shape as appropriate for the particular application, and the sectors may also have any shape as appropriate. That is, FIG. 2 is intended to facilitate an understanding of the principles of the present invention and to facilitate an understanding of the trade-off between out-of-cell interference rejection and sectorization efficiency, which is calculated by the control logic for the available antenna downtilts so that the desirable downtilt may be selected and dynamically applied.

As best shown in FIG. 2, a cell located within a code division multiple access (CDMA) network is generally indicated at 50. Model cell 50 is shown as a hexagon to facilitate an understanding of the principles associated with embodiments of the present invention. Of course, it is to be appreciated that a cell within a CDMA network may take many shapes and that a hexagon is shown herein for convenience in understanding. As shown, cell 50 is composed of three sectors, with the sector of interest indicated at 52. Of course, it is appreciated that a cell may have any number of sectors. Sector 52 is outlined in a thick solid line while the remainder of cell 50 (in addition to the area covered by sector 52) is outlined in thin solid line 54. Sector 52 is limited by a predetermined power threshold, below which the antenna would not be able to effectively communicate with a mobile device. Near the outside of sector 52, sector 52 is bounded by the edge of cell 50. That is, the threshold actually is located at dashed line 56. The remaining two sectors have threshold boundaries indicated in dashed line at 58 and 60, and are also bounded on the outside edge by cell boundary 54.

Region 62 is known as a softer handoff region. A softer handoff region is a region within a cell in which the signal received by any of a plurality of sectors (such as two adjacent sectors) is sufficient to communicate with the mobile device. That is, mobile devices within region 62 may be supported by sector 52 and by the appropriate adjacent sector 58 and/or 60.

A soft handoff region is similar to a softer handoff region, except that the handoff is from one cell to another cell. The soft handoff region of sector 52 is indicated at region 64. Within region 64, both sector 52 and the adjacent cell (not specifically shown) may support the mobile device. The softer and soft handoff regions are each defined by a handoff margin (which may be the same for both softer and soft handoff).

In accordance with the present invention, two factors that are important in determining an appropriate and intended downtilt are the relative external interference rejection and the relative sectorization efficiency for the sector of interest (as shown, sector 52). The term relative external interference rejection means the external interference at a particular amount of antenna downtilt relative to the external interference with no downtilt. Appropriately, relative sectorization efficiency means the sectorization efficiency at a particular antenna downtilt relative to the sectorization efficiency with no antenna downtilt. Generally, increasing antenna downtilt results in increased relative external interference rejection and decreased sectorization efficiency.

As shown in FIG. 2, the downtilted antenna within sector of interest 52 has an outer threshold boundary indicated in dashed line 56. The outer threshold boundary is indicated in phantom at 66 for an antenna having no downtilt. Of course, it is appreciated that the external interference is evaluated by integrating all areas outside of the cell, but it can be seen that this evaluation will generally decrease as downtilt is increased as evidenced by the movement of the threshold boundary toward the cell boundary as downtilt is increased.

Although relative external interference rejection generally increases with antenna downtilt, the inventors have found that relative external interference rejection is at a tradeoff with relative sectorization efficiency. That is, as antenna downtilt increases, relative sectorization efficiency decreases. Generally, increasing antenna downtilt increases the relative size of the handoff regions, resulting in higher percentage of mobiles in handoff. As shown, region 62 is the softer handoff region for sector 52 when the antenna is downtilted. If the antenna were not downtilted, the boundary of the softer handoff region is indicated in phantom at 68.

By applying downtilt to the antennas in a specific cell-site, the gain realized by mobile device signals within that cell-site's coverage area is increased, while the gain realized by signals from mobiles within other cells is decreased. This effectively reduces the out-of-cell interference seen in the reverse link by the base station receiver and increases cell-site capacity. Antenna downtilt also perturbs the antenna patterns in the plane of the earth, or more accurately, alters the gain contours within the coverage area of the cell-site. This in turn affects the percentage of mobile units in both soft and softer handoff.

Generally speaking, the percentage increases with downtilt, and this tends to reduce cell-site capacity. That is, downtilting the antenna reduces out-of-cell interference (increases relative external interference rejection) thereby increasing cell capacity, while at the same time causing a decrease in relative sectorization efficiency due to increased inter-sector interference, thereby decreasing cell capacity.

In accordance with the present invention, the antenna downtilt is dynamically controlled to appropriately select downtilt to balance the tradeoff between external interference rejection and sectorization efficiency. Preferably, appropriate downtilt is selected to maximize cell-site capacity. Thus, the inventors have found that with moderate antenna downtilts, the increased external interference rejection dominates over the decreased sectorization efficiency to provide increased cell-site capacity, while at greater downtilts the decrease in sectorization efficiency dominates over the increased external interference rejection causing an overall decrease in cell-site capacity.

In particular, the tradeoff between relative external interference rejection and relative sectorization efficiency may equivalently be thought of as a tradeoff between reducing out-of-cell interference effects and increasing inter-sector interference. That is, decreasing out-of-cell interference increases cell-site capacity while increasing inter-sector interference reduces cell-site capacity.

In a preferred embodiment of the present invention, the estimated relative external interference rejection is determined according to:

$$IR(\Psi)=1/(1+\eta(\Psi))$$

wherein $\Psi$ is the downtilt angle, $IR(\Psi)$ is the estimated relative external interference rejection at downtilt angle $\Psi$, and $\eta(\Psi)$ is a loading factor at downtilt angle $\Psi$.

The loading factor is determined according to:

$$\eta(\Psi)=I_{ext}(\Psi)/I_{in}(\Psi)$$

wherein $I_{ext}(\Psi)$ is out-of-cell interference at downtilt angle $\Psi$ and $I_{in}(\Psi)$ is same-sector interference at downtilt angle $\Psi$.

Of course, it would be appreciated that the embodiments of the present invention are not meant to be limited to this particular formula for relative external interference rejection, and that many other formulas may be implemented appropriately. In this preferred technique for determining relative external interference rejection, it can be observed that the interference rejection ranges from zero (infinite out-of-cell interference) to one (as out-of-cell interference approaches zero). Further, in a preferred embodiment of the present invention, sectorization efficiency is determined according to:

$$E_{sec}(\Psi)=(I_{in}(\Psi)+I_{ext}(\Psi))/(I_{in}(\Psi)+I_{sec}(\Psi)+I_{ext}(\Psi))$$

wherein $E_{sec}(\Psi)$ is the estimated relative sectorization efficiency at downtilt angle $\Psi$ and $I_{sec}(\Psi)$ is the inter-sector interference at downtilt angle $\Psi$.

That is, although the above formulas are utilized in preferred embodiments of the present invention, it is appreciated that many other evaluations may be made to estimate relative external interference rejection and relative sectorization efficiency at different downtilt angles for the current network conditions. Of course, it is understood that the term relative external interference rejection is meant to encompass any term that effectively evaluates the effects of out-of-cell interference. Further, it is to be appreciated that the term relative sectorization efficiency is meant to encompass any term that effectively evaluates the effects of inter-sector interference at the plurality of antenna downtilts for the current network conditions.

Figure 3:
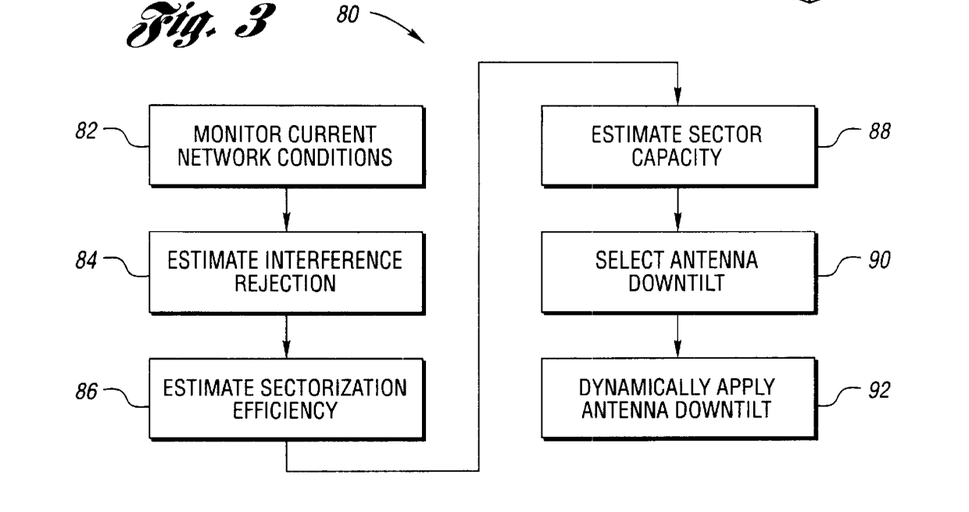
FIG. 3 is a block diagram illustrating a method of the present invention for controlling downtilt of an antenna in a sector of a cell of a CDMA network for mobile devices.

With reference now to FIG. 3, a method of the present invention is generally indicated at 80. At block 82, current network conditions are monitored. That is, traffic within the cell and traffic outside the cell are monitored. At block 84, relative external interference rejection is estimated at a plurality of antenna downtilts for the current network conditions. That is, for example, if current network conditions indicate a lot of out-of-cell interference in a heavily loaded sector, downtilting the antenna may result in high external interference rejection and increased capacity. In a cell with little external interference, downtilting the antenna may not result in increased cell capacity, and may in fact reduce cell capacity.

At block 86, the relative sectorization efficiency is estimated at the plurality of antenna downtilts for the current network conditions. At this point, the system control logic evaluates, based on the current network conditions and the estimated interference rejection and sectorization efficiency for the sector of interest at the various possible downtilts, an appropriate antenna downtilt. The appropriate antenna downtilt is preferably selected to maximize cell capacity given the existing current network conditions.

That is, preferably, at block 88, relative sector capacity is estimated for the plurality of antenna downtilts based on the current network conditions. In a preferred embodiment, the sector capacity is estimated based on a product of relative external interference rejection and relative sectorization efficiency according to:

$$C_{sec}(\Psi)=(1/(1+\eta(\Psi)))E_{sec}(\Psi)$$

wherein $C_{sec}(\Psi)$ is the estimated relative sector capacity at downtilt angle $\Psi$.

At block 90, antenna downtilt is selected, preferably based on the relative sector capacity. Of course, it is appreciated that the tradeoff represented by increasing external interference rejection while reducing relative sectorization efficiency (or alternatively, reducing the effects of out-of-cell interference while increasing the effects of inter-sector interference) may be evaluated in a variety of different ways, with the preferred evaluation technique being a product of first and second terms that represent the relative external interference rejection and the relative sectorization efficiency, respectively.

At block 92, antenna downtilt is dynamically applied to the antenna of the sector of interest. That is, unlike systems of the prior art that fix the antenna downtilt, embodiments of the present invention periodically (but without requiring any specific period, that is, intermittently) under current network conditions, estimate relative external interference rejection and relative sectorization efficiency, and dynamically apply a selected antenna downtilt to the antenna which preferably maximizes sector capacity for the particular conditions.

It is appreciated that the broad concepts of the present invention are not meant to be limited to the particular interference rejection, sectorization efficiency, and capacity functions defined above, but instead intend to encompass evaluating the tradeoff between external interference rejection and sectorization efficiency (alternatively thought of as a tradeoff between out-of cell interference effects and inter-sector interference effects) to determine a desirable downtilt and dynamically apply such downtilt to the antenna, in any number of different ways. Antenna downtilt may be provided electrically or electro-mechanically. For example, a phased array may electrically downtilt the antenna, while a servomotor may mechanically downtilt the antenna.

Further, it is to be appreciated that various other factors may be studied to determine the relationship between antenna downtilt and sector capacity, and accordingly the selection of an appropriate antenna downtilt may consider these factors in addition to those described above. The below description illustrates a particular antenna that the inventor has performed mathematical calculations with to evaluate the effects of various different characteristics of the cell-site. Accordingly, the embodiments of the present invention may further include the additional techniques discussed below in addition to those discussed previously.

While results presented below are based on a single specific antenna, the Swedcom ALP-E-9011-DIN cellular band antenna, this antenna was selected because full antenna patterns were available to the inventors in electronic form for a wide range of downtilt angles. This particular antenna has a peak gain of 12 dB, a horizontal 3-dB beamwidth of 86 degrees, and a vertical 3-dB beamwidth of 17 degrees. This antenna was evaluated in an isolated cell-site (sectorized cell-site located alone without any other cell-sites) and also for an embedded cell-site (sectorized cell-site embedded in a cluster of similar cells). For each case, certain configuration parameters were altered and the corresponding analysis was performed to investigate the relative effects of antenna downtilt in these configurations. These parameters include the number of sectors per cell-site, the handoff margin utilized, the propagation constant (assuming log-normal propagation) and the antenna height. For the embedded cell-site, the nominal cell loading factor and the inter-cell separation were also studied.

For the case of an isolated, sectorized cell-site, the sectorization efficiency, the percentage of mobile units softer handoff, the relative coverage area, and the relative sector capacity were plotted as a function of downtilt angle for a variety of sectorization schemes, handoff margins, log-normal propagation constants, and antenna heights. Those plots are not included herein, but the results are summarized below. Further, plots for the embedded cell-site are of greater interest and are included herein.

As the sectorization increases in an isolated cell-site using the same antenna (or equivalently, when the antenna beamwidth becomes too wide for the sectorization employed), the percentage of mobiles in softer handoff increases and the sectorization efficiency decreases, resulting in significant reductions in sector capacity. It is also seen that antenna downtilt exacerbates sectorization efficiency and capacity to a greater degree when antennas with wider beamwidths than necessary considering the sectorization are utilized.

The primary effect of increasing handoff margin in an isolated cell-site is that the sectorization efficiency decreases, with a corresponding decrease in sector capacity. The percentage of mobiles in softer handoff also increases. The trend in the relative decreases in sectorization efficiency with antenna downtilt is about the same in all cases, but the relative reduction in capacity is markedly higher for larger handoff margins.

Changes in the propagation characteristics do not have a dramatic impact on how antenna downtilt affects sector capacity, particularly for moderate downtilt. However, the capacity decreases a little faster with antenna downtilt under favorable propagation conditions where the propagation constant is lower. The main effect observed with propagation constant is that the relative coverage area decreases more rapidly with antenna downtilt for lower propagation constants (or equivalently lower path-loss slopes), presumably due to the fact that the initial coverage area is larger.

For the antenna heights studied (10–30 m), the antenna height has almost no effect on how either the sectorization efficiency, the percentage of mobile units in softer handoff, the relative cell-site capacity, or the relative coverage area varies as a function of antenna downtilt. From this perspective, it is seen that for all moderate angles, antenna downtilt will have the same relative effects in an isolated cell-site regardless of the antenna height.

For the case of a sectorized cell-site embedded in a cluster of similar cells, the relative inter-cell interference, the sectorization efficiency, the percentage of mobile units in both soft and softer handoff, and the relative cell-site capacity were plotted as a function of downtilt angle for a variety of loading factors, inter-cell separation distances, sectorization schemes, handoff margins, log-normal propagation constants, and antenna heights. Key results are presented here.

Figure 4:
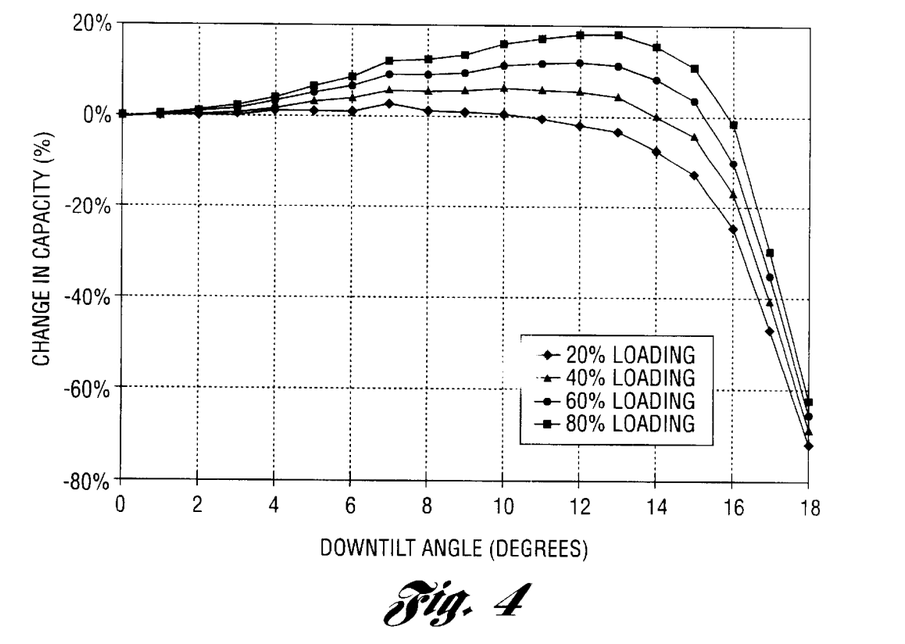
FIG. 4 depicts plots of the relative change in sector capacity for an embedded, sectorized cell-site as a function of downtilt angle for nominal loading factors of 20%, 40%, 60%, and 80% at no downtilt.

FIGS. 4–17 illustrate plots of some of the results for the antenna downtilt in an embedded cell-site. In FIG. 4, plots of the relative change in sector capacity for an embedded, sectorized cell-site as a function of downtilt angle for nominal loading factors of 20%, 40%, 60%, and 80%, at no downtilt are shown. The actual loading factor is a function of downtilt, while the nominal loading factor is the loading factor at no downtilt. The trend illustrates that higher out-of-cell interference results in greater increases in capacity for moderate downtilt angles, whereas large downtilt angles tend to reduce capacity.

Figure 5:
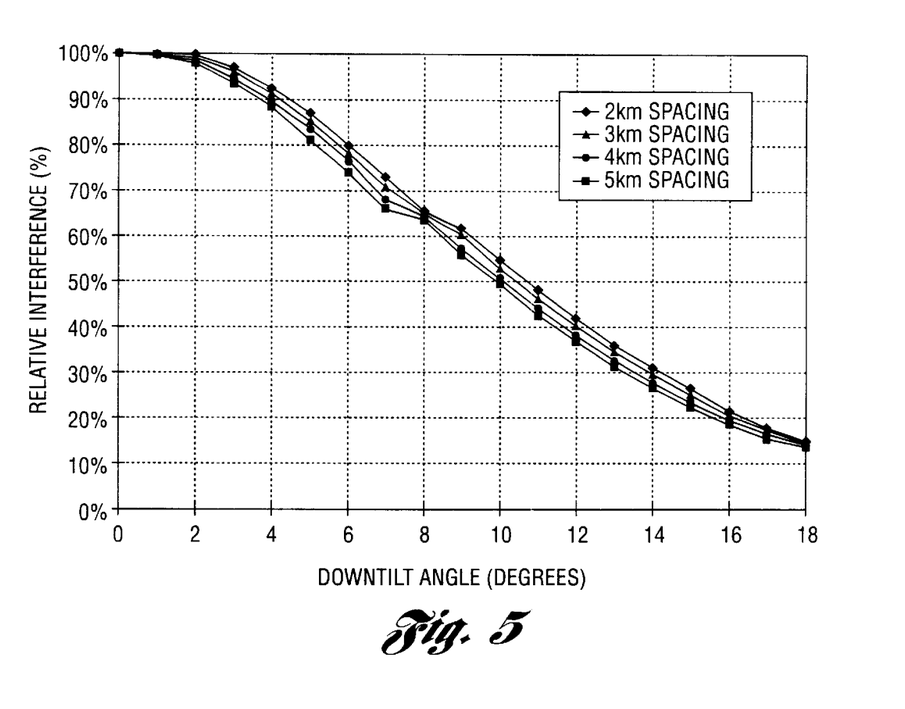
FIG. 5 depicts plots of the relative inter-cell interference as a function of downtilt angle for embedded cell-sites separated by two kilometers, three kilometers, four kilometers, and five kilometers.

In FIG. 5, plots of the relative inter-cell interference as a function of downtilt angle for embedded cell-sites separated by 2 kilometers, 3 kilometers, 4 kilometers and 5 kilometers are illustrated.

Figure 6:
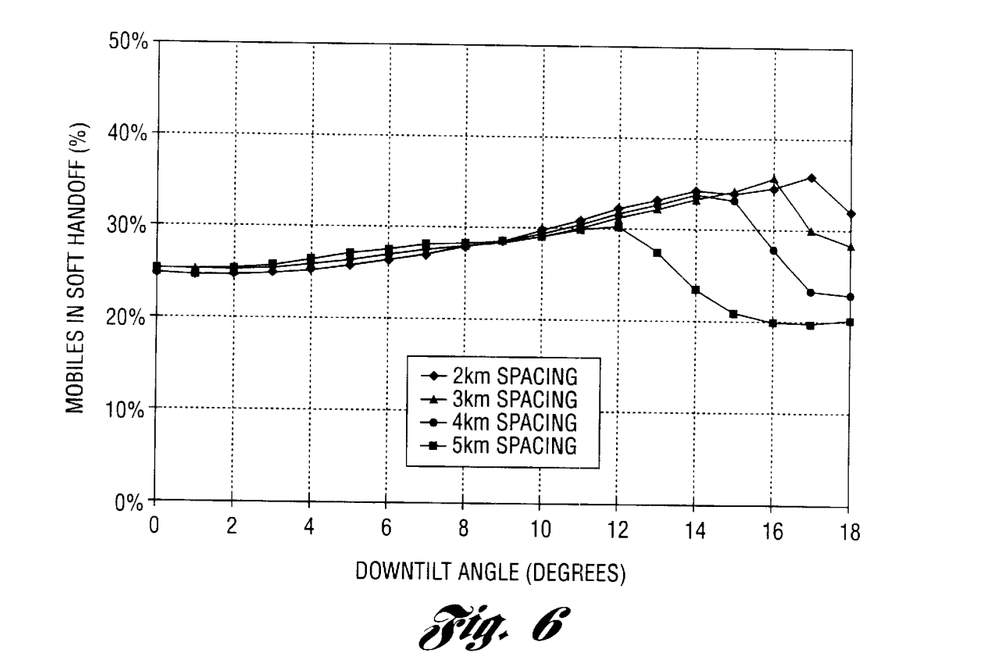
FIG. 6 depicts plots of the percentage of mobiles in soft handoff as a function of downtilt angle for embedded cell-sites separated by two kilometers, three kilometers, four kilometers, and five kilometers.
Figure 7:
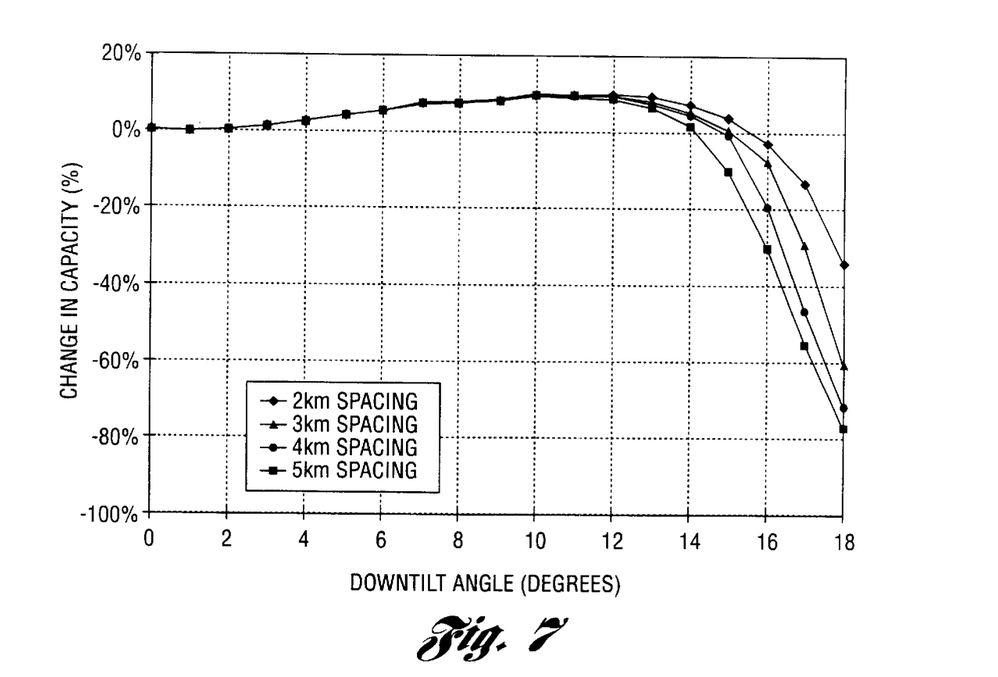
FIG. 7 depicts plots of the relative change in sector capacity as a function of downtilt angle for embedded cell-sites separated by two kilometers, three kilometers, four kilometers and five kilometers.

FIG. 6 depicts plots of the percentage of mobiles in soft handoff as a function of downtilt angle for embedded cell-sites separated by two kilometers, three kilometers, four kilometers, and five kilometers. FIG. 7 depicts plots of the relative change in sector capacity as a function of downtilt angle for embedded cell-sites separated by two kilometers, three kilometers, four kilometers and five kilometers.

Figure 8:
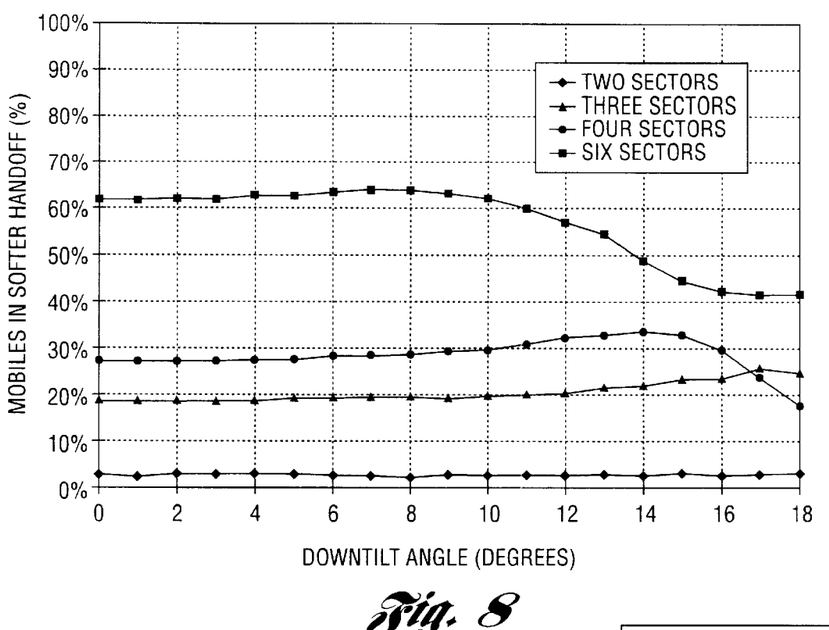
FIG. 8 depicts plots of the percentage of mobile units in softer handoff as a function of downtilt angle for an embedded cell-site with two, three, four, and six sectors.
Figure 9:
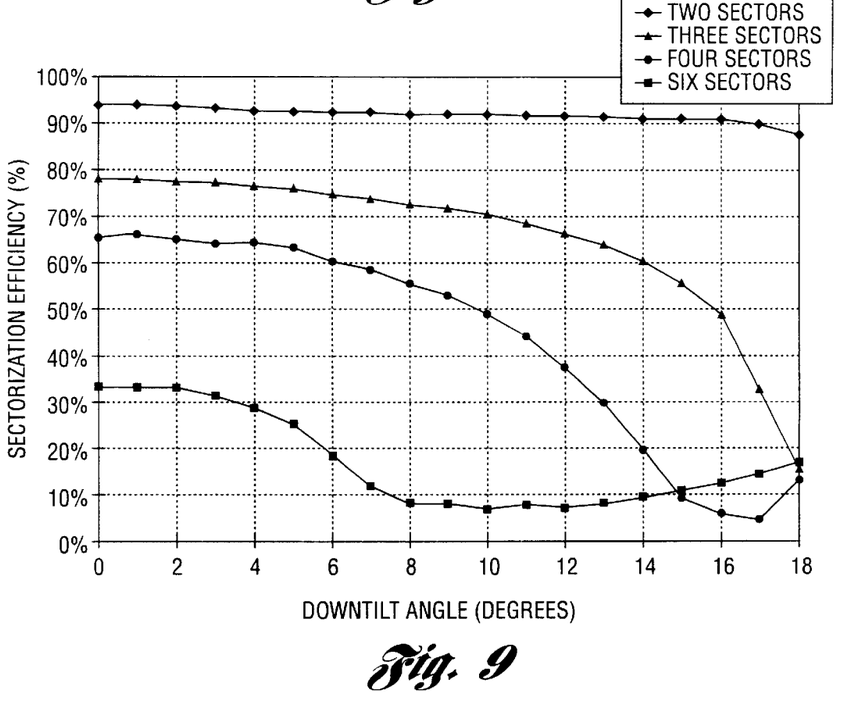
FIG. 9 depicts plots of the sectorization efficiency as a function of downtilt angle for an embedded cell-site with two, three, four, and six sectors.

FIG. 8 depicts plots of the percentage of mobile units in softer handoff as a function of downtilt angle for an embedded cell-site with two, three, four, and six sectors. FIG. 9 depicts plots of the sectorization efficiency as a function of downtilt angle for an embedded cell-site with two, three, four, and six sectors.

Figure 10:
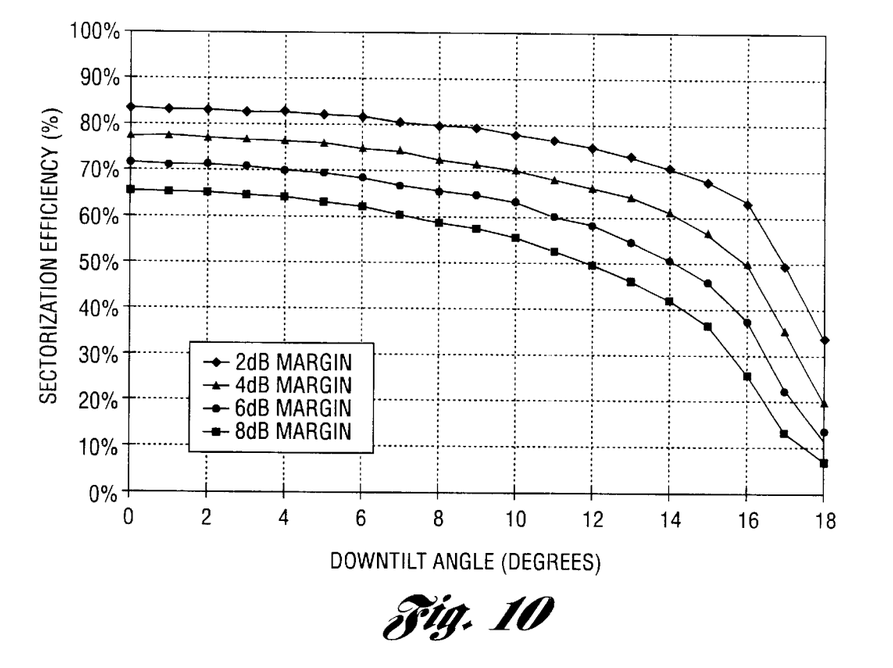
FIG. 10 depicts plots of the sectorization efficiency as a function of downtilt angle for an embedded cell-site assuming handoff margins of two decibels, four decibels, six decibels and eight decibels.
Figure 11:
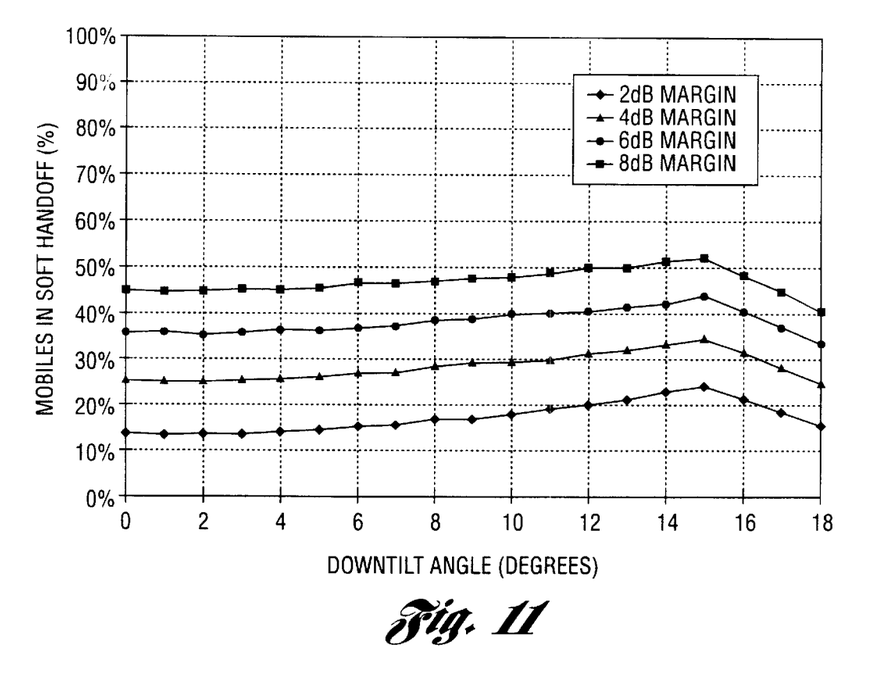
FIG. 11 depicts plots of the percentage of mobile units in soft handoff as a function of downtilt angle for an embedded cell-site assuming handoff margins of two decibels, four decibels, six decibels and eight decibels.
Figure 12:
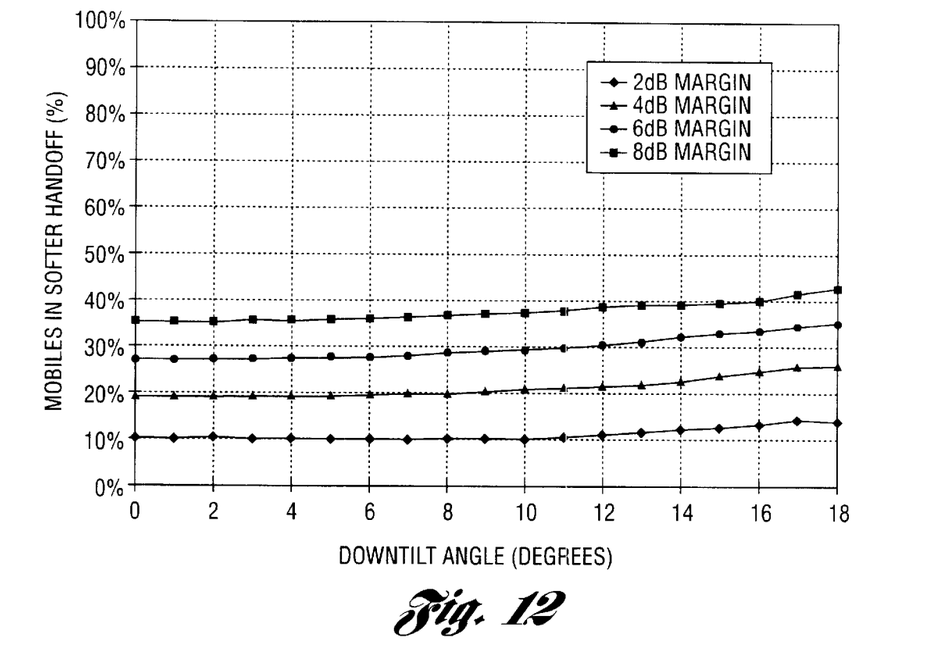
FIG. 12 depicts plots of the percentage of mobile units in softer handoff as a function of downtilt angle for an embedded cell-site assuming handoff margins of two decibels, four decibels, six decibels and eight decibels.
Figure 13:
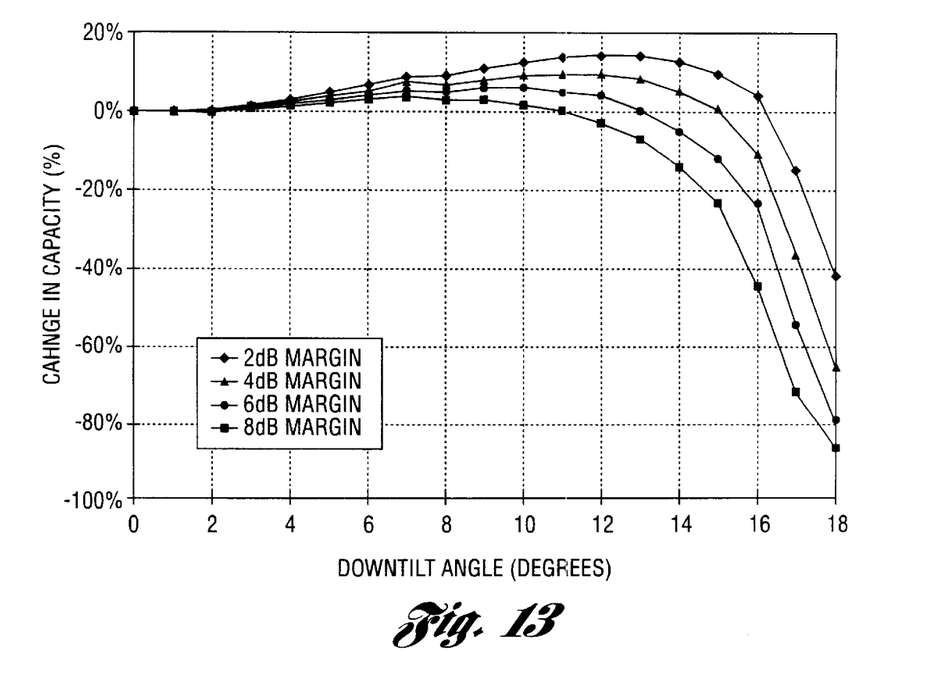
FIG. 13 depicts plots of the relative sector capacity as a function of downtilt angle for an embedded cell-site assuming handoff margins of two decibels, four decibels, six decibels, and eight decibels.

FIG. 10 depicts plots of the sectorization efficiency as a function of downtilt angle for an embedded cell-site assuming handoff margins of two decibels, four decibels, six decibels and eight decibels. FIG. 11 depicts plots of the percentage of mobile units in soft handoff as a function of downtilt angle for an embedded cell-site assuming handoff margins of two decibels, four decibels, six decibels and eight decibels. FIG. 12 depicts plots of the percentage of mobile units in softer handoff as a function of downtilt angle for an embedded cell-site assuming handoff margins of two decibels, four decibels, six decibels and eight decibels. FIG. 13 depicts plots of the relative sector capacity as a function of downtilt angle for an embedded cell-site assuming handoff margins of two decibels, four decibels, six decibels, and eight decibels.

Figure 14:
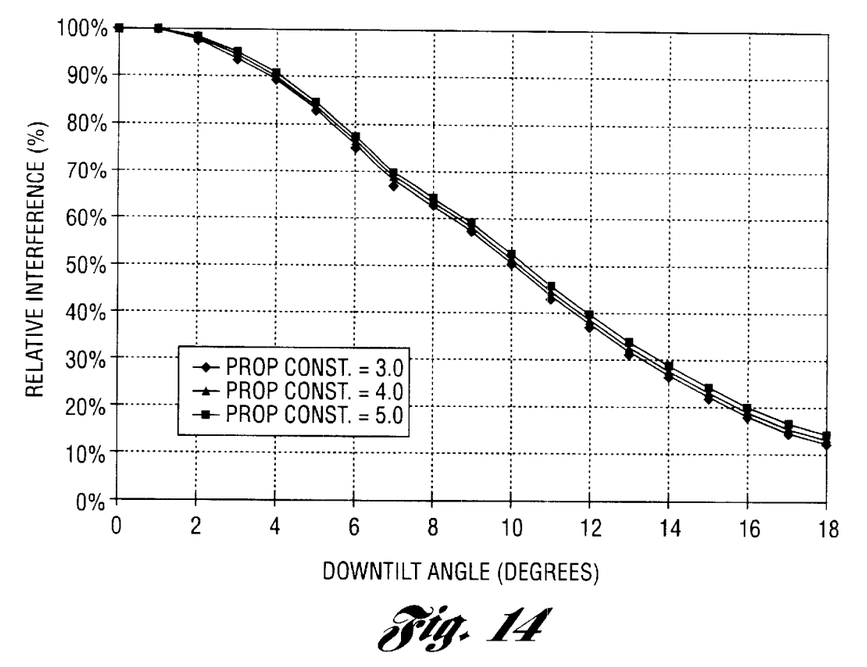
FIG. 14 depicts plots of the relative percentage of inter-cell interference seen by the base station as a function of downtilt angle for an embedded cell-site assuming propagation constants of 3.0, 4.0, and 5.0.
Figure 15:
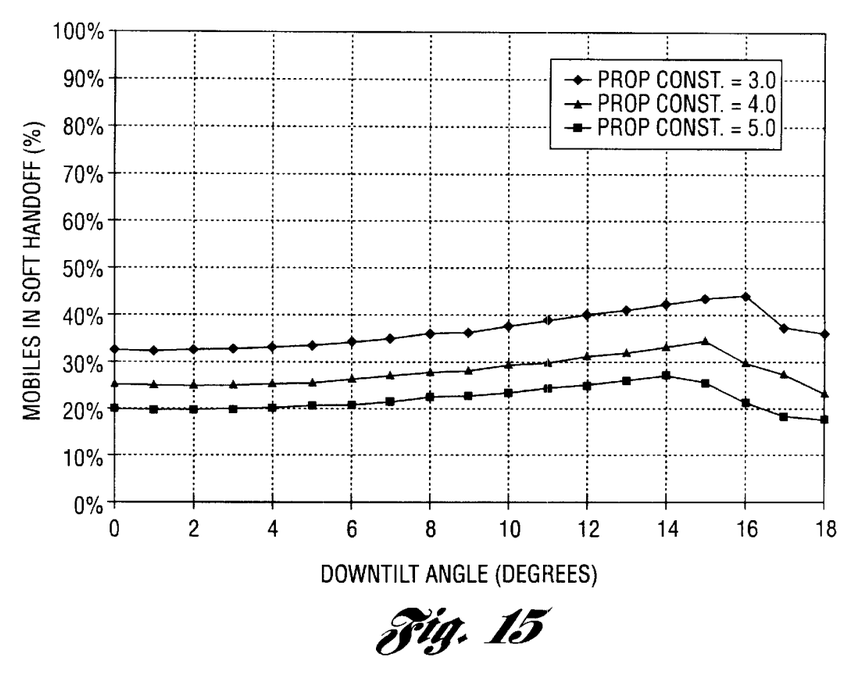
FIG. 15 depicts plots of the percentage of mobile units in soft handoff with adjacent cell-sites as a function of downtilt angle for an embedded cellsite assuming propagation constants of 3.0, 4.0, and 5.0.

FIG. 14 depicts plots of the relative inter-cell interference seen by the base station as a function of downtilt angle for an embedded cell-site assuming propagation constants of 3.0, 4.0, and 5.0. FIG. 15 depicts plots of the percentage of mobile units in soft handoff with adjacent cell-sites as a function of downtilt angle for an embedded cell-site assuming propagation constants of 3.0, 4.0, and 5.0.

Figure 16:
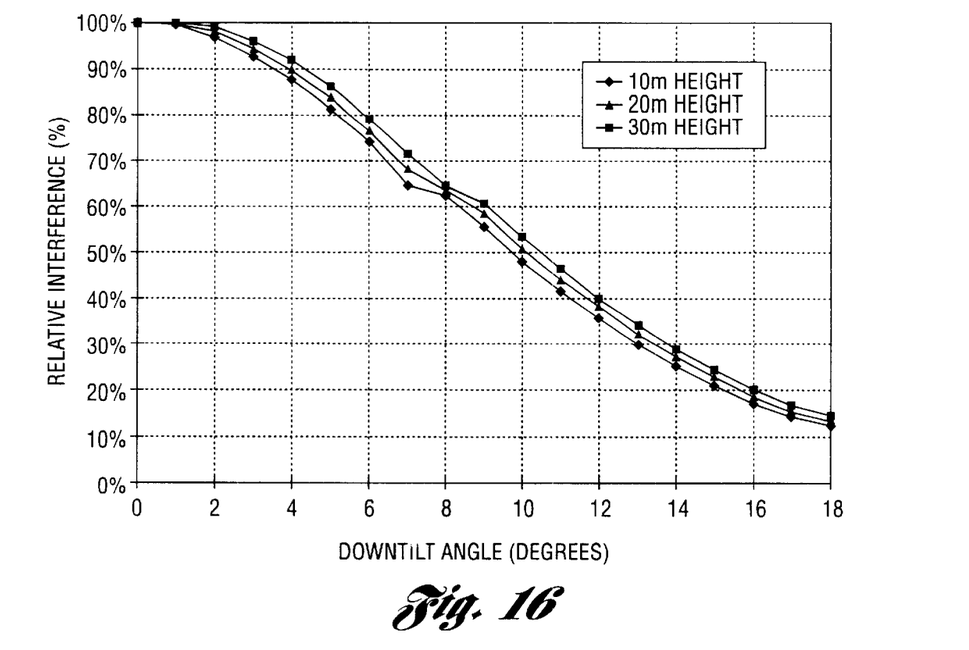
FIG. 16 depicts plots of the relative percentage of inter-cell interference seen by the base station as a function of downtilt angle for an embedded cell-site assuming antenna heights of 10 meters, 20 meters, and 30 meters.
Figure 17:
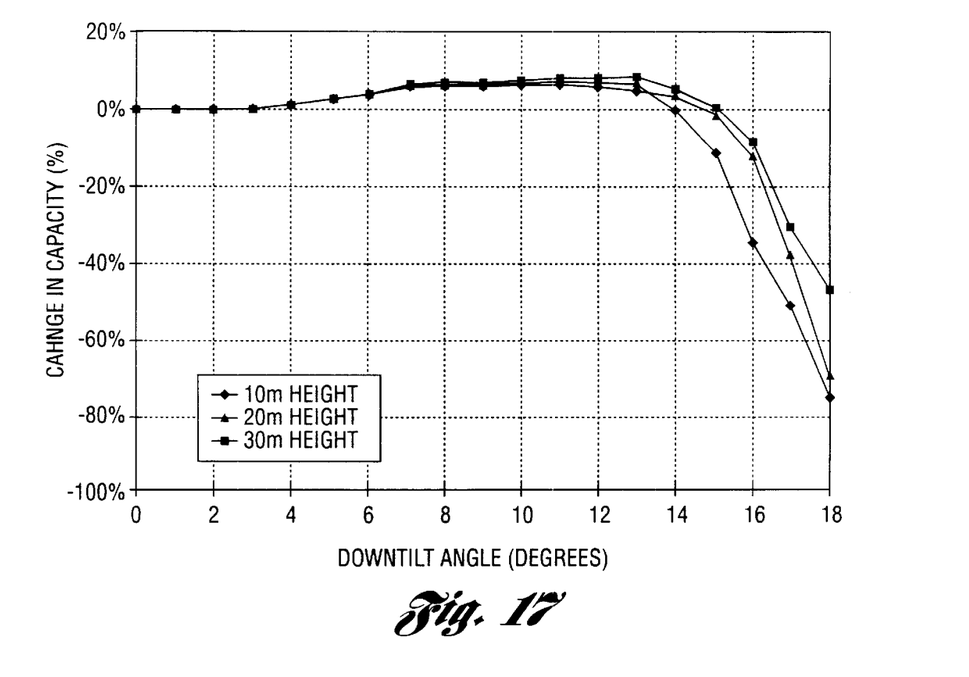
FIG. 17 depicts plots of the relative change in sector capacity as a function of downtilt angle for an embedded cell-site assuming antenna heights of 10 meters, 20 meters, and 30 meters.

FIG. 16 depicts plots of the relative inter-cell interference seen by the base station as a function of downtilt angle for an embedded cell-site assuming antenna heights of 10 meters, 20 meters, and 30 meters. FIG. 17 depicts plots of the relative change in sector capacity as a function of downtilt angle for an embedded cell-site assuming antenna heights of 10 meters, 20 meters, and 30 meters.

The cell loading factor in an embedded cell-site describes the amount of interference due to mobile units in other cells relative to the interference generated within the cell-site of interest. While the relative percentage of out-of-cell interference rejected depends on antenna downtilt alone, the overall impact on cell-site capacity depends on the loading factor. Therefore, it is seen that very significant increases in capacity sometimes approaching 20% can be provided by antenna downtilt in a heavily loaded cell where much of the interference comes from outside of the cell. The increase in capacity becomes less for lightly loaded cells. In all cases, however, the antenna downtilt should never approach the vertical beamwidth of the antenna.

Inter-cell separation will also affect the net benefit of antenna downtilt. Slightly more antenna downtilt is required in closely-spaced cells than in distant cells to attain the same level of interference rejection, as would be expected. It is found that the percentages of mobile units in both soft and softer handoff do not exhibit a strong dependence on cell spacing. These percentages do exhibit a weak dependence on downtilt angle, particularly for moderate downtilt angles. Due to the improved interference rejection, however, the net increase in capacity for closely-spaced cells is greater than for cells with larger separation, even when the same nominal loading factor is assumed. One would expect closely-spaced cells to be more heavily loaded by mobile units in other cells, and therefore the realistic differences in capacity as a function of antenna downtilt with cell separation would be even greater (providing even more benefit for closer cells) than indicated herein.

As is the case in an isolated cell-site, the sectorization efficiency and percentage of mobile units in softer handoff in an embedded cell-site are seriously degraded when antennas with a horizontal beamwidth which is too wide for the sectorization scheme are used. Since the relative reduction in inter-cell interference with downtilt angle is the same for all sectorization schemes, the capacity is governed by the sectorization efficiency. For two or three sectors, relative increases in capacity are possible through the use of antenna downtilt. For highly-sectorized sites, however, the capacity is dramatically reduced when downtilt is employed.

For the embedded cells, the handoff margin has a dramatic effect on the percentage of mobile units both in soft and softer handoff, as expected. The percentages of mobiles in both soft and softer handoff appear to increase only slightly with downtilt for all moderate angles. Sectorization efficiency is higher for lower margins, and the efficiency decreases with increasing downtilt, particularly for large angles. The overall capacity displays the associated behavior, with capacity increasing with downtilt angle up to a point and then decreasing. A greater increase in capacity is achievable when lower handoff margins are used, and the optimal downtilt angle is also larger with lower margins.

Results show that the propagation constant has essentially no impact on either the sectorization efficiency or the percentage of mobiles in softer handoff in an embedded cell-site, and only minimal impact on the reduction in inter-cell interference as a function of antenna downtilt. However, the percentage of mobiles in soft handoff with adjacent cells will be affected by the propagation constant (even though the soft handoff area is only a weak function of downtilt angle). It is seen that the same relative increase in capacity is achievable in all propagation environments.

Antenna height has very little effect on either sectorization efficiency or how the percentage of mobile units in soft and softer handoff varies as a function of antenna downtilt. The relative reduction in inter-cell interference, however, is slightly more dependant on antenna height than propagation characteristics. A higher antenna requires more downtilt to achieve the same amount of interference rejection than a lower antenna, as expected. The corresponding increase in sector capacity does vary a little with antenna height, and slightly higher relative increases in capacity can be provided by antenna downtilt for higher antennas than for lower antennas in an embedded cell-site. It should also be noted that larger downtilt angles can be tolerated for higher antennas.

All in all, the nominal cell loading factor and the cell-site separation appear to have the greatest impact on the relative increase in capacity by applying downtilt to the antennas, since these two factors play a major role in determining inter-cell interference. The heavier the cell is loaded and the closer it is to other cell-sites, the larger will be the relative increase in traffic capacity. Use of antennas that have a wider beamwidth than required will degrade overall capacity, and this will only be exacerbated by antenna downtilt. Handoff margin, propagation constant, and antenna height will only play a secondary role in determining the relative increase in cell-site capacity. Higher relative increases in capacity are achievable when the handoff margin is lower, the antenna height is higher, or the propagation constant is worse (higher path-loss slope).

In accordance with the present invention, there are a number of ways in which the relative interference rejection and sectorization efficiency may be estimated based on monitoring of the current network conditions and those ways described herein are exemplary in nature. For example, either an empirically-based model or an analytically-based model may be used. In an empirical model, a historical record of the relationship between antenna downtilt and relative interference rejection, and between antenna downtilt and sectorization efficiency, may be built and subsequently utilized by the control logic via look-up tables. In an analytic model, the antenna pattern data and an analytical model may be utilized to compute these downtilt values according to the model. While the specific implementation of the control logic algorithms may vary based on the application, the present invention is intended to encompass dynamic downtilt to effectively optimize cell capacity regardless of the specific algorithms employed.

Of course, FIGS. 4–17 show the trends associated with one particular antenna that the inventors have tested, and it is to be appreciated that different antennas may have different results. In accordance with the present invention, the important concept is the evaluation of the tradeoff between relative external interference rejection and relative sectorization efficiency (which may be thought of as the evaluation of the tradeoff between reducing out-of-cell interference while increasing inter-sector interference) and after such evaluation, selecting an appropriate antenna downtilt for dynamic application. As such, the embodiments of the present invention are not meant to be limited to any particular antenna, particular field pattern, or particular formula for evaluating relative external interference rejection or any particular formula for evaluating relative sectorization efficiency, or any other formula mentioned previously.

While the best mode for carrying out the invention has been described in detail, those familiar with the art in which this invention relates will recognize various alternative designs and embodiments for practicing the invention defined by the following claims.

What is claimed is:

1. A method for controlling downtilt of an antenna in a sector of a cell of a code division multiple access (CDMA) network for mobile devices, the method comprising:

monitoring current network conditions;

estimating relative external interference rejection at a plurality of antenna downtilts for the current network conditions according to:

$$IR(\Psi)=1/(1+\eta(\Psi))$$

wherein $\Psi$ is the downtilt angle, $IR(\Psi)$ is the estimated relative external interference rejection at downtilt angle $\Psi$, and $\eta(\Psi)$ is a loading factor at downtilt angle $\Psi$, the loading factor being determined according to:

$$\eta(\Psi)=I_{ext}(\Psi)/I_{in}(\Psi)$$

wherein $I_{ext}(\Psi)$ is out-of-cell interference at downtilt angle $\Psi$, and $I_{in}(\Psi)$ is same-sector interference at downtilt angle $\Psi$;

estimating relative sectorization efficiency at the plurality of antenna downtilts for the current network conditions according to:

$$E_{sec}(\Psi)=(I_{in}(\Psi)+I_{ext}(\Psi))/(I_{in}(\Psi)+I_{sec}(\Psi)+I_{ext}(\Psi))$$

wherein $E_{sec}(\Psi)$ is the estimated relative sectorization efficiency at downtilt angle $\Psi$ and wherein $I_{sec}(\Psi)$ is the inter-sector interference at downtilt angle $\Psi$;

estimating relative sector capacity at the plurality of antenna downtilts for the current network conditions based on a product of the corresponding relative external interference rejection and the corresponding relative sectorization efficiency;

selecting the antenna downtilt based on the relative sector capacity at the plurality of antenna downtilts; and dynamically applying the selected downtilt to the antenna.

2. A method for controlling downtilt of an antenna in a sector of a cell of a code division multiple access (CDMA) network for mobile devices, the method comprising:

monitoring current network conditions;

estimating relative external interference rejection at a plurality of antenna downtilts for the current network conditions;

estimating relative sector capacity at the plurality of antenna downtilts for the current network conditions;

selecting an antenna downtilt based on the relative sector capacity at the plurality of antenna downtilts and further based on the relative external interference rejection at the plurality of antenna downtilts; and dynamically applying the selected downtilt to the antenna.

3. The method of claim 2 further comprising:

estimating relative interference rejection at the plurality of antenna downtilts for the current network conditions, wherein the selected antenna downtilt is further based on the relative interference rejection at the plurality of antenna downtilts.

4. The method of claim 3 wherein the estimated relative external interference rejection is based on a loading factor that is a ratio of out-of-cell interference to same-sector interference.

5. The method of claim 2 further comprising:

estimating relative sectorization efficiency at the plurality of antenna downtilts for the current network conditions, wherein the selected antenna downtilt is further based on the relative sectorization efficiency at the plurality of antenna downtilts.

6. The method of claim 5 wherein the estimated relative sectorization efficiency is based on a ratio of a sum of same-sector interference and out-of-cell interference to a sum of the same-sector interference, inter-sector interference, and the out-of-cell interference.

7. The method of claim 2 wherein the cell includes a plurality of sectors, and wherein estimating the relative sector capacity further comprises:

estimating a percentage of mobile devices within the sector that are in a softer handoff region defined by a softer handoff margin between the sector and an adjacent sector within the same cell.

8. The method of claim 2 wherein antenna downtilt is selected so as to effectively maximize the relative sector capacity.

9. A method for controlling downtilt of an antenna in a sector of a cell of a code division multiple access (CDMA) network for mobile devices, the method comprising:

monitoring current network conditions;

estimating relative external interference rejection, based in part on out-of-cell interference, at a plurality of antenna downtilts for the current network conditions;

estimating relative sectorization efficiency, based in part on inter-sector interference, at the plurality of antenna downtilts for the current network conditions;

estimating relative sector capacity at the plurality of antenna downtilts for the current network conditions based on the corresponding relative external interference rejection and the corresponding relative sectorization efficiency;

selecting an antenna downtilt based on the relative sector capacity at the plurality of antenna downtilts; and dynamically applying the selected downtilt to the antenna.

10. A system for controlling downtilt of an antenna in a sector of a cell of a code division multiple access (CDMA) network for mobile devices, the system comprising control logic configured to:

monitor current network conditions;

estimate relative sector capacity at a plurality of antenna downtilts for the current network conditions;

estimate relative external interference rejection at the plurality of antenna downtilts for the current network conditions;

select an antenna downtilt based on the relative sector capacity at the plurality of antenna downtilts and further based on the relative external interference rejection at the plurality of antenna downtilts; and dynamically apply the selected downtilt to the antenna.

11. The system of claim 10 wherein the control logic is further configured to:

estimate relative interference rejection at the plurality of antenna downtilts for the current network conditions, wherein the selected antenna downtilt is further based on the relative interference rejection at the plurality of antenna downtilts.

12. The system of claim 11 wherein the estimated relative external interference rejection is based on a loading factor that is a ratio of out-of-cell interference to same-sector interference.

13. The system of claim 10, wherein the control logic is further configured to:
estimate relative sectorization efficiency at the plurality of antenna downtilts for the current network conditions, wherein the selected antenna downtilt is further based on the relative sectorization efficiency at the plurality of antenna downtilts.

14. The system of claim 13 wherein the estimated relative sectorization efficiency is based on a ratio of a sum of same-sector interference and out-of-cell interference to a sum of the same-sector interference, inter-sector interference, and the out-of-cell interference.

15. The system of claim 10 wherein the cell includes a plurality of sectors, and wherein the control logic estimates the relative sector capacity by:
estimating a percentage of mobile devices within the sector that are in a softer handoff region defined by a softer handoff margin between the sector and an adjacent sector within the same cell.

16. The system of claim 10 wherein antenna downtilt is selected so as to effectively maximize the relative sector capacity.

* * * * *